United States Patent [19]

McBurney et al.

[11] Patent Number: 5,448,773
[45] Date of Patent: Sep. 5, 1995

[54] LONG LIFE PORTABLE GLOBAL POSITION SYSTEM RECEIVER

[75] Inventors: Paul W. McBurney, Santa Clara; David J. Gilman, San Francisco; Lynn Weber, Saratoga; Arthur N. Woo, Cupertino, all of Calif.

[73] Assignee: Trimble Navigation Limited Sunnyvale, Calif.

[21] Appl. No.: 831,870

[22] Filed: Feb. 5, 1992

[51] Int. Cl.⁶ .............................................. H04B 1/16
[52] U.S. Cl. ................................ 455/343; 455/12.1; 455/38.3
[58] Field of Search ............... 455/343, 33.1, 38.3, 455/54.1, 56.1, 9, 12.1, 13.4, 89; 342/357

[56] References Cited

U.S. PATENT DOCUMENTS

| | | | |
|---|---|---|---|
| 4,755,816 | 7/1988 | DeLuca | 455/38.3 |
| 4,962,523 | 10/1990 | Tanaka | 455/89 |
| 5,095,308 | 3/1992 | Hewitt | 455/343 |
| 5,101,510 | 3/1992 | Duckeck | 455/343 |
| 5,119,504 | 6/1992 | Durboraw, III | 455/89 |
| 5,161,255 | 11/1992 | Tsuchiya | 455/343 |
| 5,204,986 | 4/1993 | Ito et al. | 455/343 |
| 5,222,242 | 6/1993 | Ando et al. | 455/343 |

Primary Examiner—Edward F. Urban
Assistant Examiner—Nguyen Vo
Attorney, Agent, or Firm—Thomas E. Schatzel

[57] ABSTRACT

A global positioning system (GPS) receiver having a radio frequency (RF) circuitry to receive position signals from a plurality of satellites and to provide an intermediate frequency (IF) signal to a correlator circuitry for generating a pseudo range and a Doppler measurement for calculating a position fix. The GPS receiver further has a power supply system which has at least one battery and an alternative external power connector for connecting to an external power source. The GPS receiver further has a microprocessor having a read only memory (ROM). The microprocessor is electrically connected to the RF circuitry and the power supply system. Since the GPS receiver does not need to constantly process all the GPS position signals that are available to it to provide a useful tool, the ROM includes a program for automatically controlling the power supply to the RF circuitry so that battery power is conserved.

9 Claims, 8 Drawing Sheets

LONG LIFE PORTABLE GLOBAL POSITION SYSTEM RECEIVER

BACKGROUND OF THE INVENTION

1. Field of the Invention

This invention relates generally to a global position system (GPS) receiver, and more particularly to a portable GPS receiver having an intelligent power supply controller capable of reducing the battery power consumption without position accuracy degradation.

2. Description of the Prior Art

GPS is a positioning and navigation system which receives signals from a plurality of satellites for determining a two or three dimensional position of the receiver. This positioning system is capable of performing a position determination over the entire surface of the globe by receiving signals from a subset of twenty four satellites. These satellites operate on six orbits about 20,200 KM above the earth with each orbit accommodating four satellites. In receiving the signals from these satellites, a GPS receiver periodically computes the latitude, longitude, altitude and time on a real time basis.

To determine a three-dimensional position, the signals from four satellites are required while to make a determination of a two-dimensional position, the signals from three satellites are sufficient. Typical examples of the former are satellites and airplanes and those of the later are ships and cars. However, a three-dimensional position is often required if an automobile is travelling in a mountain region where there are great elevation variations in travelling a short distance.

The GPS system was originally developed for military use. It was then made available for civilian applications including navigation systems for ships, aircraft and automobiles. In the past few years, portable, hand-held GPS receivers have also become publicly available. These convenient portable receivers were made possible, in part, as a result of the miniaturization of electronic devices which continues to reduce the size, weight and power consumption of the electronic components. The portability of a GPS receiver however is often limited by the size and weight of the batteries providing power to the receiver. To sustain prolong periods of operation, a heavy and bulky battery system is required. On the other hand, use of light-weight small batteries require either frequent re-charge or replacement thus making the operation of such a hand-held receiver more expensive and less convenient.

Many U.S. patents disclose power saving methods for digital signal receiving or paging systems. Basically, a receiver or transmitter of these systems is maintained in an "idle" state with very low or complete off power states. Either a hardware or a software system is provided to monitor when incoming signals are received. The receiving system is activated when incoming signals are detected. Then the power is automatically turned off after reception of the signals is complete. Even though this general concept of power saving is widely known, the implemented methods however are not of practical use to a GPS receiver. Unlike the general digital receivers, paging or remote telephone systems, a GPS receiver maintains a table listing all the visible satellites and their positions. A GPS receiver must receive almanac signals from these satellites every twelve hours to compute the satellite positions with moderate accuracy. A more accurate satellite position calculation must also be performed by receiving ephemeris data from the satellites every hour. The collection of almanac data takes about twelve minutes and the collection of ephemeris takes about thirty seconds. A GPS receiver is not totally "idle" even between the signal reckoning times. Continuous status checking of satellites and the data receiving channels must also be performed. Depending on the results of the status checking, a GPS receiver then determines a schedule to sequentially activate each signal receiving channel. Therefore, the method of maintaining an idle state and passively waiting before the arrival of a signal to save battery power as disclosed in the U.S. patents for the general digital signal receiving systems are not useful for reducing the power consumption in a GPS receiver.

Several commercially available GPS receivers are on the market which utilize a set of six AA size alkaline batteries and various means are provided for the receiver operator to save power in preserving the battery life. In SportNav, a Loran C receiver system, a twenty-five hour period of operation is estimated with six AA alkaline batteries. The user is provided the option of a backup battery pack so that the batteries can be quickly replaced. No specific power saving mechanism is implemented in this product.

Another product with the model name PRONAV GPS 100 uses six disposable alkaline batteries and a rechargeable battery pack. It also allows the use of an external power source to provide continuous navigation updates. GPS 100 has a "Battery Saver Mode" operable on a pack of alkaline batteries for fourteen hours and a "QuickFix Mode" which automatically completes four position fixes per hour and allows the receiver to operate for longer periods of time with six alkaline batteries. Under most dynamic circumstances, use of QuickFix to obtain four position fixes per hour is not satisfactory. The usefulness of PRONAV GPS 100 is limited because the length of battery life is likely to be greatly shortened when the limited operations allowable under the "Battery Saver Mode" or "QickFix Mode" are not sufficient to satisfy the position accuracy requirements unless there is external power source readily available.

Another hand-held GPS receiver, the Magellan NAV 1000, is powered by six AA alkaline batteries. For the purpose of reducing battery power consumption and extending the life of the batteries, a PowerSaveR mode is provided under which the receiver can be manually turned on to compute a position fix. After the position fix is stored as the last fix, the receiver then turns itself off. The receiver can also operate continuously and automatically revert to PowerSaveR mode when a 'battery low' condition is detected. NAV 1000 also allows the unit to operate on an external power source. It is instructed in the User's manual not to collect almanac information in hand-held operation using the battery because of the concern of the limited battery life. The usefulness of the hand-held GPS receiver would probably be limited due to these limitations.

Therefore, the prior art hand-held portable GPS receivers operating on battery power are typically useful for a very limited period of time if operated continuously. Except where an external power source is readily available, position fix computations on the order of once per second or even once per minute in order to minimize dead reckoning errors would not be possible. This greatly limits the application of hand-held GPS receivers. When no external power source is available, a hand-held battery operated GPS receiver has only limited usefulness due to the short battery life.

SUMMARY OF THE PRESENT INVENTION

It is therefore an object of the present invention to provide a battery-powered GPS receiver which can operate for a long period of time while maintaining a sufficient calculation rate.

It is another object of the present invention to provide a battery-powered GPS receiver which can continuously and dynamically respond to various operational conditions to minimize battery power consumption.

It is a further object of the present invention to make use of the intelligence of an executable program implemented on a read only memory (ROM) to control the power supply to a GPS receiver.

Briefly, in a preferred embodiment, the present invention comprises a global positioning system (GPS) receiver having radio frequency (RF) circuitry to receive position signals from a plurality of satellites and provide an intermediate frequency (IF) signal to a correlator circuit for generating a pseudo range and a Doppler measurement for calculating a position fix. The GPS receiver further has a power supply system having at least one battery and an alternative external power connector for connecting to an external DC power source. The GPS receiver further has a microprocessor and a read only memory (ROM). The microprocessor is electrically connected to the RF circuitry and the power supply system. The ROM includes an executable program capable of automatically controlling the power supply system to provide a plurality of power levels ranging from zero to a maximum power level to the RF circuitry so that the battery power consumption is minimized.

It is an advantage of the present invention that the executable program residing in the ROM can continuously and dynamically respond to the operation conditions by adjusting the schedules and power level provided to the RF circuitry to minimize any unnecessary power consumption.

It is another advantage of the present invention that with the capability of responding to operational conditions, the battery-powered GPS receiver can be used in inaccessible rural areas and heterogeneous mountain districts with long battery life without sacrificing the frequency of position fix computations.

It is a further advantage of the present invention that the collection of almanac and ephemeris data, and the acquisition and reacquisition of satellites can be carried out on a substantially regular basis because of the very efficient management of battery power during these operation cycles.

It is a further advantage of the present invention that a GPS receiver user has the option to input several operational constants depending on the user specific operations whereby the battery power can be optimally used for the specific operation the user intends to apply.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1:
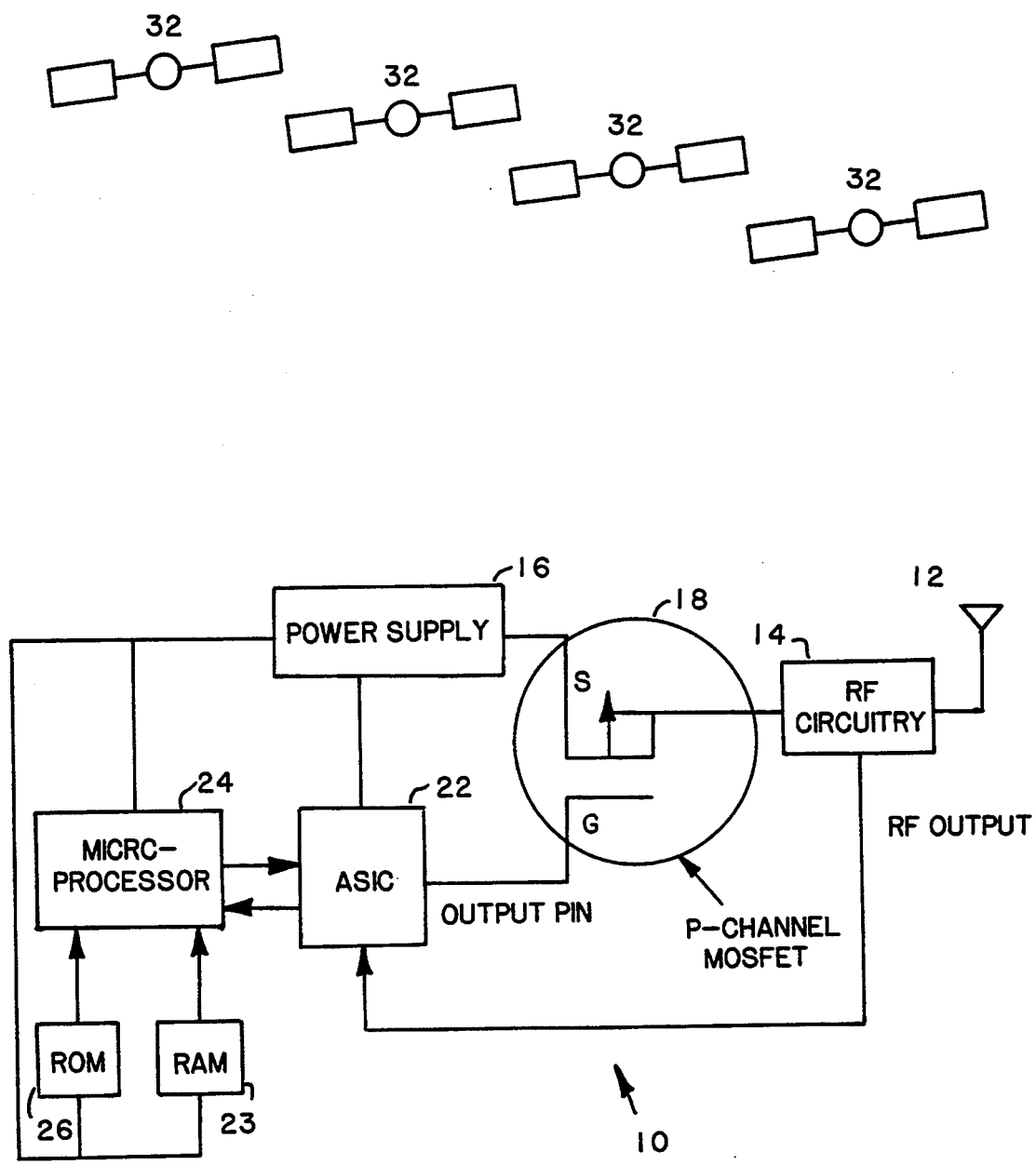
FIG. 1 is a schematic block diagram of a GPS receiver according to the present invention.

FIG. 1 illustrates a GPS receiver 10 having an antenna 12, a radio frequency (RF) circuitry 14, a power supply 16, a power supply controller 18, an application specific integrated circuit (ASIC) 22, a random access memory (RAM) 23, a microprocessor 24, and a read only memory (ROM) 26. Antenna 12 receives navigation data signals from a plurality of satellites 32. A list of visible satellites is kept in the random access memory (RAM) 23 accessible to microprocessor 24 and ROM 26. Based on the current estimated position of the GPS receiver 10, the azimuth and the elevation of each satellite 32 in the constellation are computed. If the elevation angle of a satellite is positive and is greater than a mask angle, e.g., ten degrees, the satellite is considered visible. When a satellite first becomes visible, it is first included in the "to be acquired" list and an acquisition operation is executed to obtain the code phase and frequency of the satellite signals and collect the satellite's ephemeris. The visible satellite is added to the tracking list and maintained as under the "tracking state" when the signals received from the satellite are capable of generating measurements. Another situation is that a satellite which has been in the tracking state suddenly is lost because the signals are blocked by trees, tunnels, or buildings or because of excessive vehicle dynamics. The satellite is categorized as being in the "lost state". The executable program, residing in ROM 26, constantly checks the states of the satellites 32 and sets a flag for each satellite indicative of the current tracking state.

After the signals are received from the satellites 32, RF circuitry 14 first amplifies and then down converts the received RF signals to intermediate frequency (IF) signals. ASIC 22 includes a clock, data filters, demodulation circuits and integrators to simultaneously process through multiple channels the signals received from multiple satellites 32. ASIC 22 receives the IF signals from RF circuitry 14 and generates the pseudo-range (code phase) and the Doppler (frequency) measurements. These measurements are then used by microprocessor 24 for position fix computations.

With the advance of modern electronics, all electronic components are made smaller in size and meanwhile capable of performing many intelligent functions with less power requirements. However, the battery life of a hand-held portable GPS receiver is still frequently limited by the power requirements of the RF circuitry 14. In order to reduce power consumption of the RF circuitry 14 and to prolong the battery life of GPS receiver 10, power supply controller 18 is under the control of an executable program residing in the ROM 26 to automatically adjust power level input to RF circuitry 14 to efficiently utilize the electric power provided by power supply 16.

Figure 2:
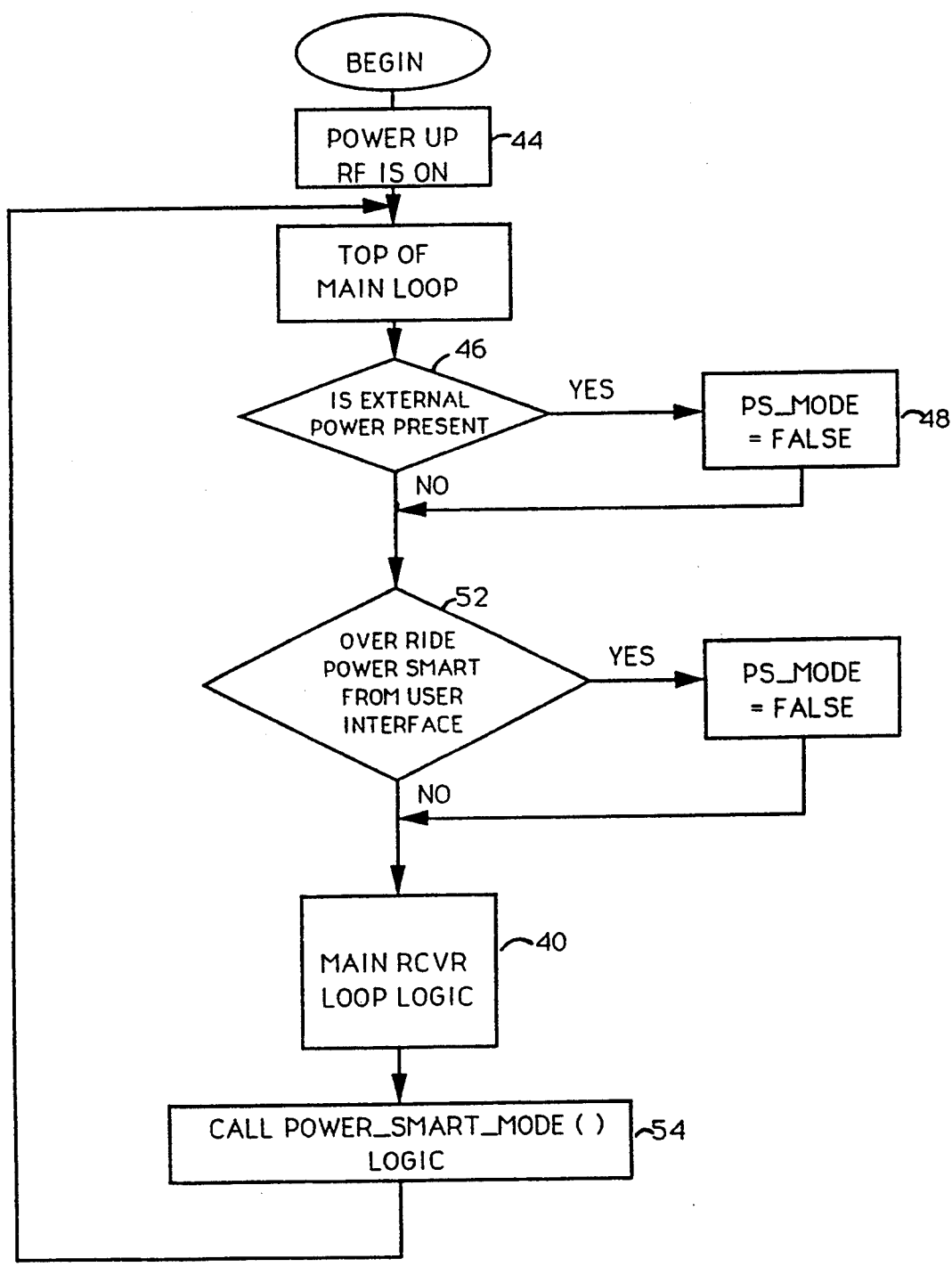
FIG. 2 is a flow chart diagram of the main receiver loop logic of the receiver of FIG. 1.

FIG. 2 is a flow chart diagram showing the logic sequence performed by the executable program residing in ROM 26 to control power supply 16. The ROM executable program includes a MAIN_RCVR_LOGIC module 40 which is initiated when receiver 10 is turned on by a step 44. With a step 46, a first check is made to determine if power supply 16 is connected to an external power source. Step 48 determines if power supply 16 is connected to an external power source, and if so, the power saving module POWER_SMART_MODE is not executed. If power supply 16 is not connected to an external power source, an operator of the GPS receiver is allowed an option to bypass the execution of the power saving program. A check is make to determine if there is an user override command to bypass the execution of the power saving module in a step 52. The power saving module POWER_SMART_MODE is invoked in a step 54 when power supply 16 is not connected to an external power source and there is no user override command to bypass POWER_SMART_MODE power saving module.

MAIN_RCVR_LOOP 40 is executed on a periodical basis such as once per every second to compute and update the position fix and to perform all other general functions of the receiver. The rate of position fix computations is basically fixed. A lower rate of position fix may be implemented when there is a need to save the battery power as determined by the logic below. MAIN_RCVR_LOOP 40 also allocates the visible satellites to the physical tracking channels and schedules the measurements to be taken for each satellite on the tracking list.

Figure 3A:
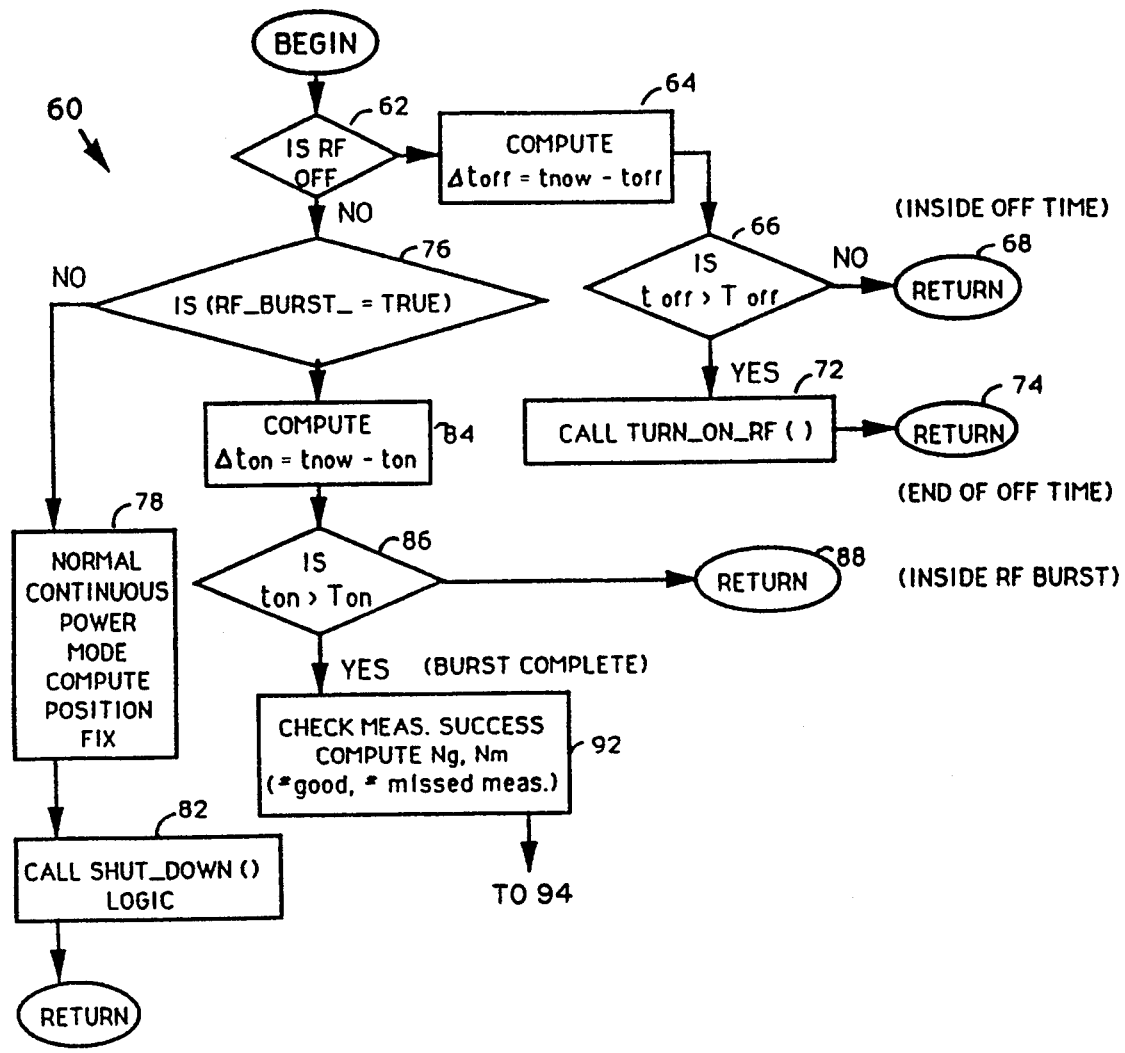
FIG. 3 is a flow chart diagram of the power saving module Power_Smart_Mode of the loop logic of FIG. 2.
Figure 3B:
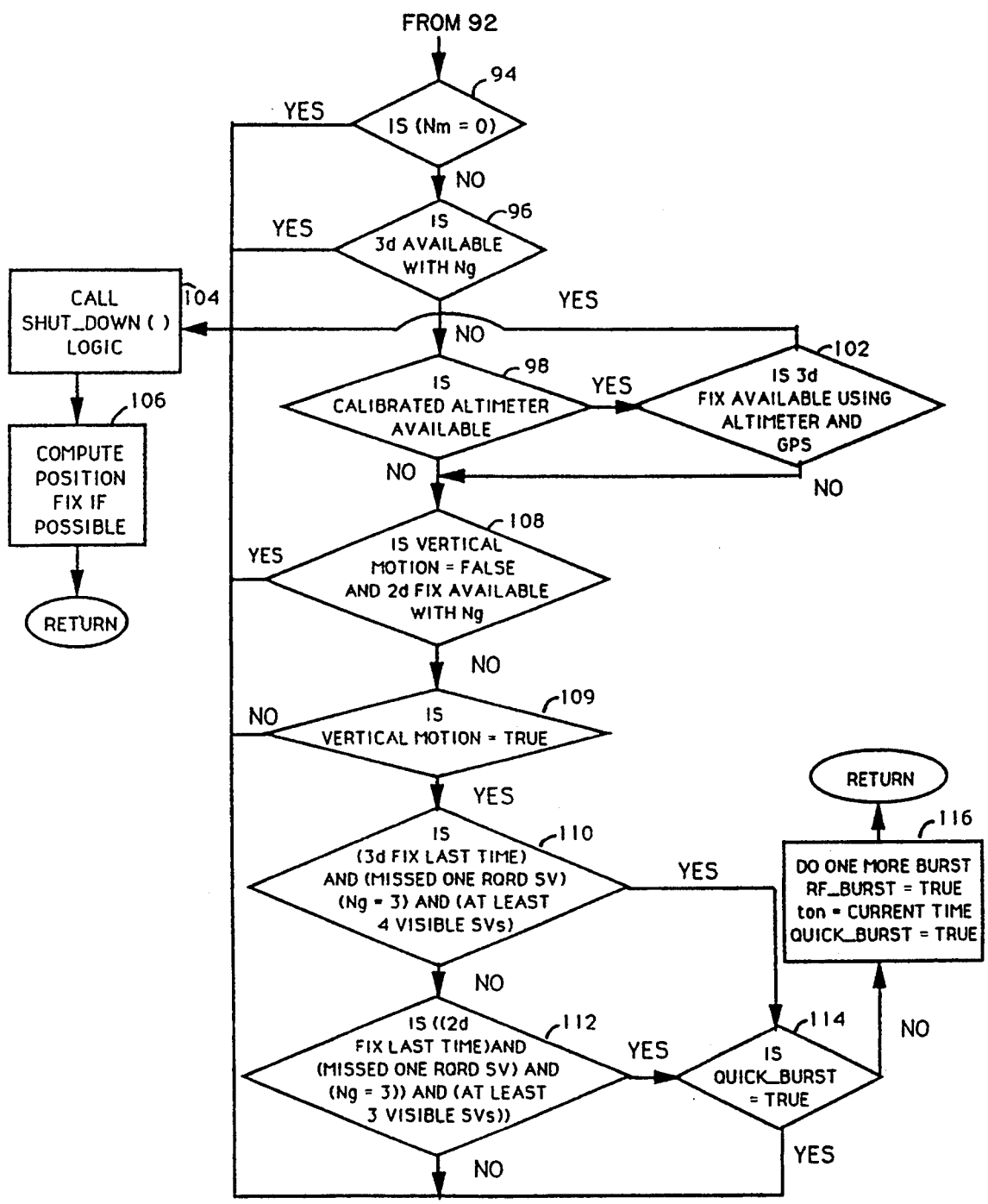

FIG. 3 shows the steps executed by a power saving module POWER_SMART_MODE 60 within the program of ROM 26. In a step 62, it first determines the on/off status of RF circuitry 14. If the RF circuitry 14 has the power turned off, the time that the power is off is first computed in a step 64 and the time off is compared to the length of time that the power is scheduled to be off, i.e., Toff in a step 66. If the time off is still within the time window of scheduled time off, the execution of POWER_SMART_MODE 60 is finished for this pass and returned to the beginning of MAIN_RCVR_LOOP 40. Otherwise a subroutine TURN_ON_RF is called in a step 72 before returning in a step 74. On the other hand, if the RF power is on, in a step 76 an enquiry is made to determine if time is within the window of an RF burst, i.e., RF_BURST=true, and if POWER_SMART_MODE is true. A normal continuous power mode with position fix computation is executed in a step 78 proceeded with calling a shutdown logic module in a step 82. If RF burst=true and POWER_SMART_MODE=true as determined in step 76, the time of the RF power on is calculated in a step 84 and compared with the scheduled RF power on time window, i.e., Ton in a step 86. It loops back to continue the wait if the calculated time on is within the time window in a step 88, otherwise the RF burst is completed.

A test is made to determine how many good measurements, i.e., Ng, and how many missed measurements, i.e. Nm, are processed by use of the signals received from the satellites in a step 92. When there are sufficient good measurements to compute a three-dimensional (3-D) position fix, including the conditions that 1) there are enough good measurements, Ng, to compute a 3-D position fix in step 96, or 2) there is calibrated altimeter available in a step 98 and a 3-D fix is available using ALTIMETER and GPS in a step 102, or 3) there are no missed measurements, i.e. Nm=0 in step 94, then a shut down logic is called in a step 104 to turn the RF power off and compute a position fix in a step 106.

Even if there are not sufficient measurements to compute a 3-D position but if the vertical motion is small and two-dimensional (2-D) position computation is achievable as determined in a step 108, again a shut down logic module is called in the step 104 and a 2-D position fix is computed in the step 106. If computation of either 3-D or 2-D position is not achievable, then a check is first made to determine if VERICAL_MOTION is true (step 109). A shutdown logic module is called if VERICAL_MOTION is not true, otherwise a sequence of status checks are made to determine whether another RF burst will be performed (step 116) and the RF power will continue to stay on for one more RF burst. In step 110, it is first determined if a three-dimensional fix is performed during the last RF burst and if there are three good measurements and there are at least four visible space vehicles. After satisfying the test conditions in step 110, one more RF burst is executed (step 116), otherwise further tests are performed in step 112 to determine if another RF burst should be executed, based on the test results from step 112, which determines whether a two-dimensional fix is likely to be successful. Only one more RF burst is allowed because QUICK_BURST is set to true in step 116 and step 114 checks the value of QUICK_BURST allowing the RF burst to be executed only once. The purpose of this logic is to attempt to at least obtain a two-dimensional fix even if there is vertical motion. The two-dimensional position fixes may not be sufficiently accurate but they can be useful for a GPS receiver to search for the satellites.

The length of each RF burst depends on the number of channels, the number of satellites and the length of time required for each satellite. For example, if GPS receiver 10 is a three-channel receiver and the time required for each satellite is 0.5 second, for a group of seven satellites an RF burst of 1.5 seconds, i.e. three times 0.5 seconds, is required, where three is the number of RF cycles needed to handle seven satellites with three channels. The length of the RF burst is thus designed to be sufficient to obtain a measurement from each satellite on the tracking list.

Figure 4:
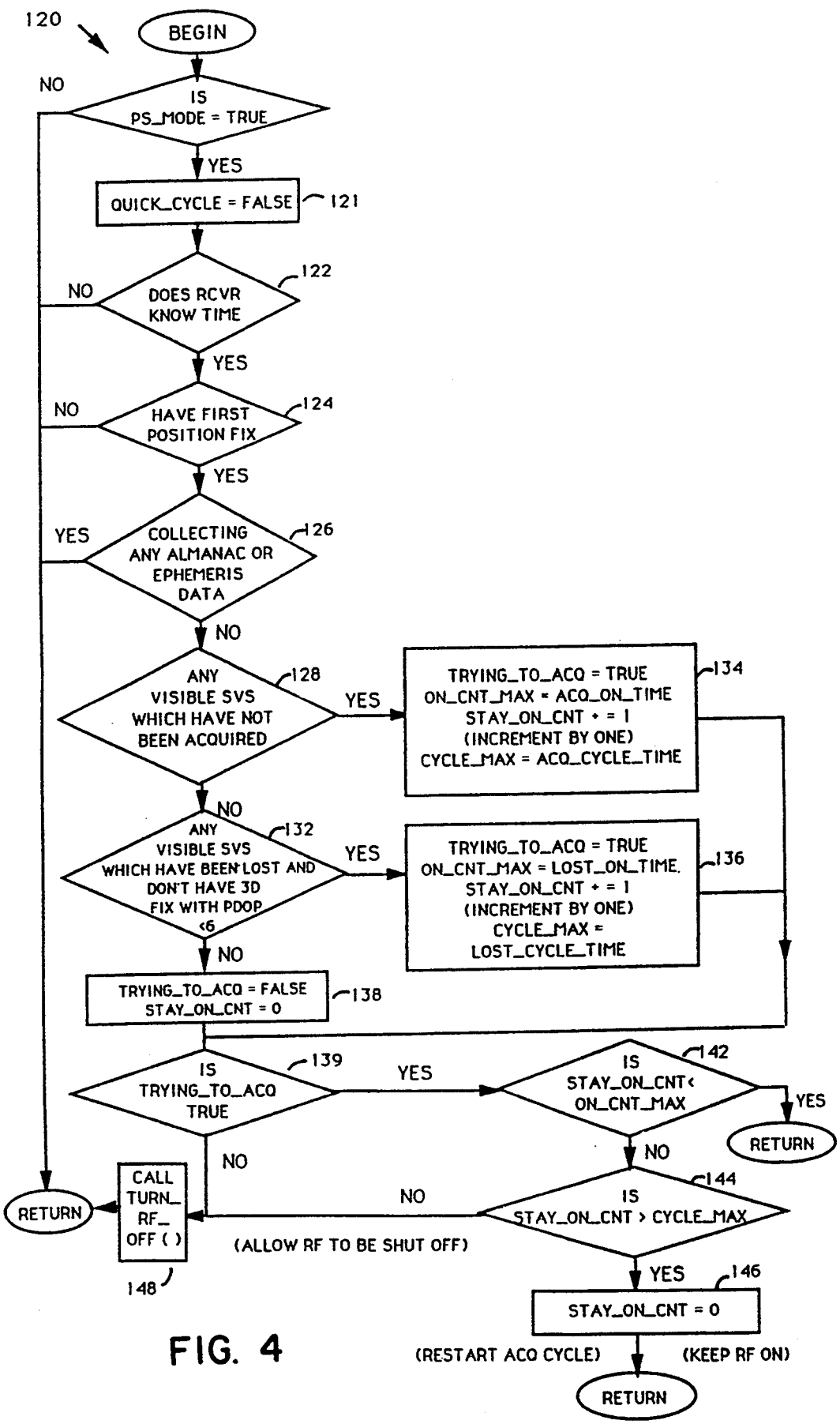
FIG. 4 is a flow chart diagram of the shut down module which conducts several status checks and performs acquisitions or reacquisitions before turning off the power to the RF circuitry of the receiver of FIG. 1.

FIG. 4 shows the logic of a SHUT_DOWN Module 120 of the program of the ROM 26. When SHUT_DOWN module 120 is called, it first sets QUICK_CYCLE to a value of false (step 121) and checks whether the GPS receiver 10 knows the time in a step 122. If so, it checks if there is a position fix in a step 124, and if yes, if it is time to collect more almanac or ephemerals data in a step 126. The RF power is kept on if either of the test results for the first two enquiries, i.e. steps 122 or 124, are negative or the test result of the third enquiry, i.e. step 126, is positive. The age of the GPS almanac is checked periodically so that it is generally no more than twelve hours old. A flag is set if a new almanac is needed or if no almanac is available. Before the RF power is turned off, it is further tested if any visible space vehicles (SVS) which have not been acquired in a step 128, or if any SVS have been lost and whether a three-dimensional fix having a PDOP less than six (step 132) is not available with the current tracking list. If either of the above tests, i.e. steps 128 or 132, are true, a satellite acquisition cycle begins in a step 134 or 136 and a flag TRYING_TO_ACQ is set to 1, i.e. true, otherwise it is set to zero, i.e. false in a step 138. The purpose of step 132 is to save power when there are lost satellites but a good fix is available anyway. TURN_RF_OFF is then called to save power without trying to acquire the lost satellite. Otherwise,the acquisition is attempted for a maximum number of times, i.e. ON_CNT_MAX in step 142 and for a maximum number of cycles, i.e. CYCLE_MAX in step 144 then the cycle is reset to zero in a step 146 and the RF power is turned off in a step 148.

Figure 5:
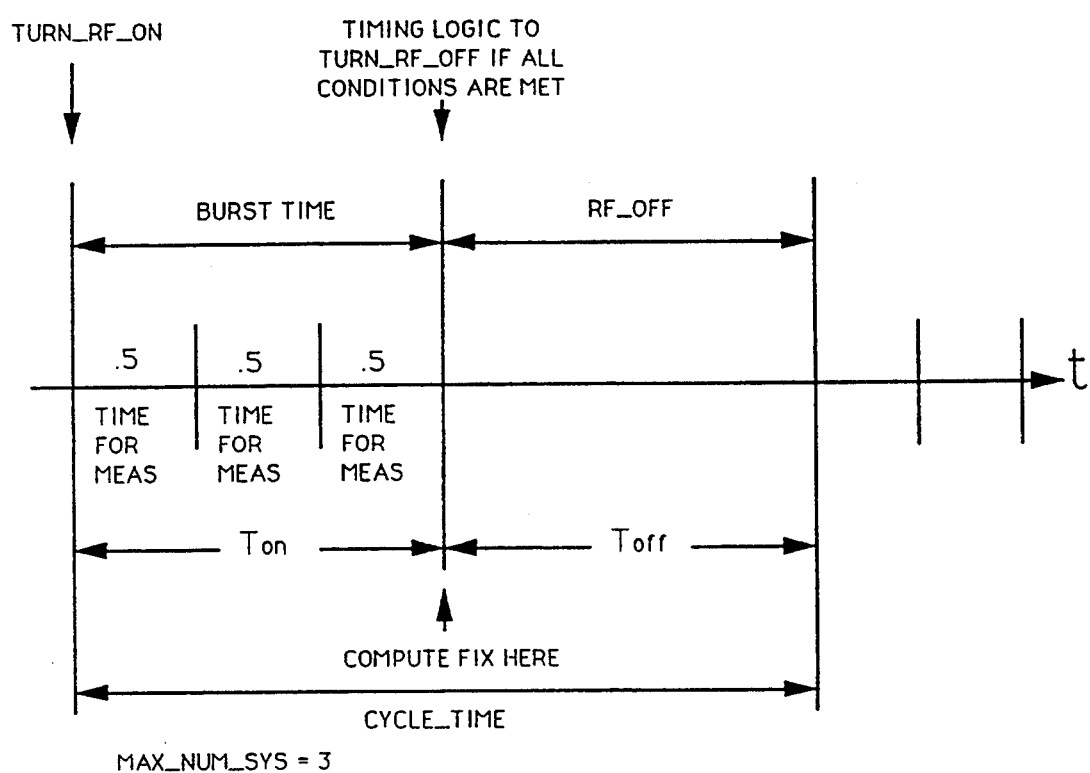
FIG. 5 illustrates the acquisition time cycles implemented to conserve battery power.

In order to acquire a new satellite, a large range of frequency and code phases must be searched to find the satellite signals, thus it takes a longer duration to acquire new satellites with RF burst. Therefore, initial acquisition will require the RF circuitry 14 to be on for a period of time which is adequate to complete the search and the search must also be made consecutively in time. It is normal that new satellites added to the tracking list will not be acquired, for as long as a few minutes, when the elevation mask is low because of blocking by trees or buildings. In order to conserve battery power, the acquisition is only attempted periodically with the RF on for an adequate time to properly search for the satellite. The power provided to RF circuitry 14 is turned on continuously for a period of ACQ_ON_TIME and then turned off until next RF ACQ_CYCLE_TIME is due (FIG. 5). A power saving is achieved because the RF power is not kept on through the entire acquisition time. A similar technique is used to acquire lost satellites. Reacquisition is treated slightly different because there is typically more information available about a lost satellite and it can be found in shorter length of time. The on and off times are set differently. An example of time limits for reacquisition is to maintain the power on for a time period of ten seconds and a cycle time of thirty seconds, while for initial acquisition the power is kept on for thirty seconds instead of ten and a cycle time of one hundred and twenty seconds instead of thirty.

The acquisition and reacquisition operations are implemented in the SHUT_DOWN logic. Before the RF circuitry 14 is turned off, attempts are made to acquire and reacquire the new or lost satellite. The acquisition or reacquisition are repeated a fixed number of cycles before proceeding to shutoff of the RF power. Since the SHUT_DOWN logic is called repeatedly after a fixed time interval, acquisition and reacquisition will be attempted again if the previous operation fails. Since for a hand-held GPS receiver 10, the most frequent situation is the temporary loss of communication due to tree or building blockage, power saving is achieved by not keeping the RF power for the entire period of time when trying to reacquire the lost satellite.

When a SHUT_DOWN is performed, the power provided to RF circuitry 14 is turned off for a brief period of time which depends on the desired accuracy of the dead reckoning while the RF is off, the number of channels of the receiver, the distribution of the satellites to each channel, and the way that satellites are acquired. For a hand-held GPS receiver 10, because the acceleration is generally low and the accuracy requirement is typically at about 100 meters, a turn off time of four to five seconds is generally acceptable.

An important factor for power savings as taught in this invention is that the benefits of power savings are not disrupted when a satellite is lost or not yet acquired. The acquisition is accomplished with the RF power turned on only periodically. Meanwhile a test is made to determine if a 2-D solution is sufficient. No second attempt will be made if there is enough data for a 2-D position fix. The RF power is turned off right after the RF burst.

Figure 6:
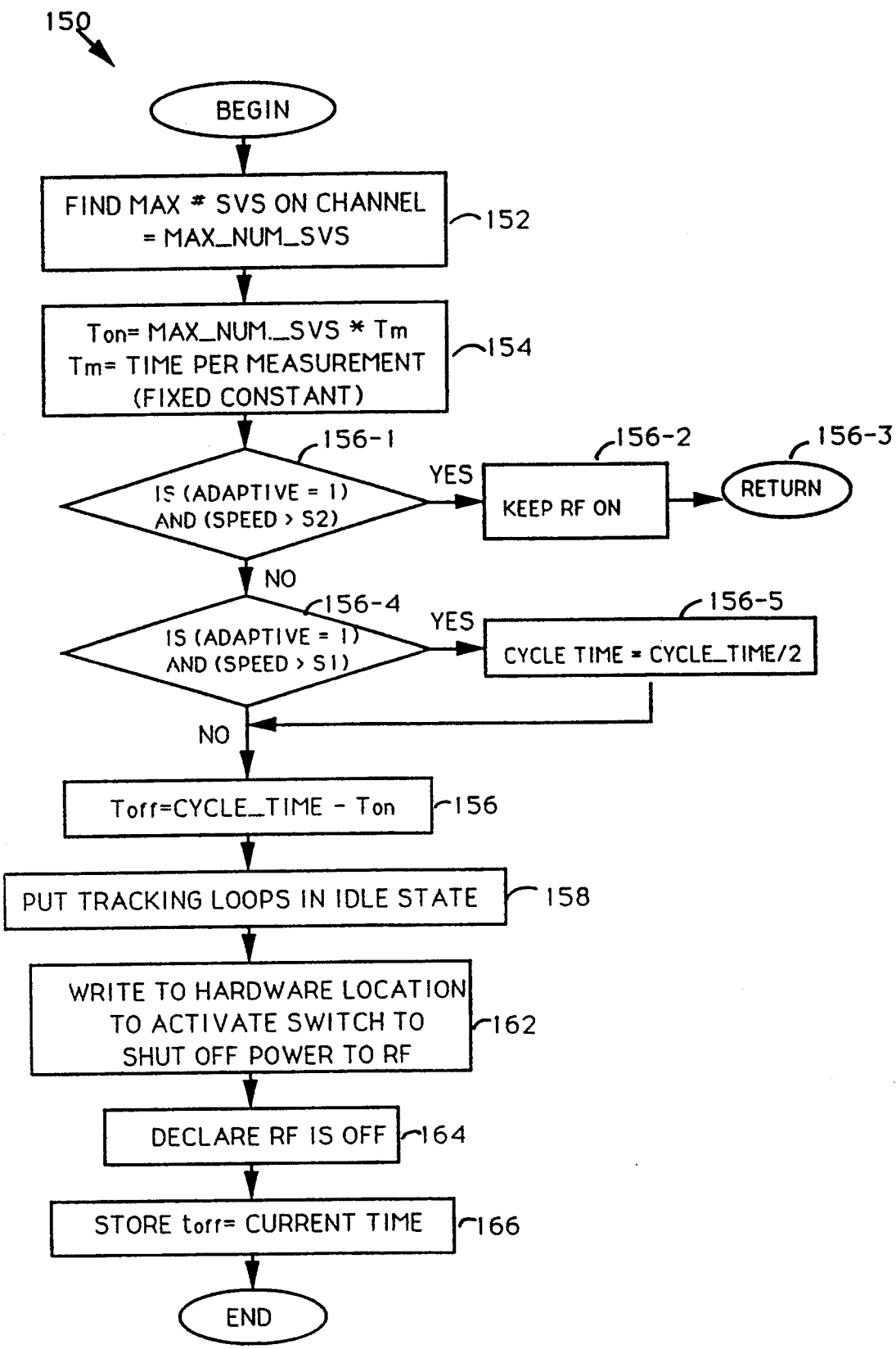
FIG. 6 is a flow chart diagram of the TURN_OFF_RF module of the receiver of FIG. 1.

FIG. 6 illustrates the logic of TURN_OFF_RF module 150 of the ROM 26. It first calculates the on time, i.e. Ton and off time Toff by first determining the maximum number of space vehicles (SVS) on each of the GPS receiver channels in a step 152 and Ton is the product of maximum number of SVS and the time per measurement which is fixed constant in a step 154. Toff is computed by subtracting the on time from the cycle time in a step 156. The RCVR tracking loops are put in an idle state in a step 158 and a hardware command is issued to activate a switch to shut off power to RF in a step 162 to save power. The state of RF power is set to off in a step 164 and the time when RF power is turned off is set to the current time in a step 166. The RF power will be turned on when a preset scheduled time off is up (see steps 66 and 72).

Instead of setting the CYCLE_TIME as a constant, TURN_OFF_RF logic 150 adaptively changes the CYCLE_TIME as a function of speed. This adaptive process is enabled by a user's setting ADAPTIVE=TRUE. This is particularly useful when a GPS receiver is moving at a high speed. It is to be noted that if a receiver is moving at a constant velocity vector there is no dead reckoning (DR) error if even the receiver is moving at high speed. However, if a turn is made at high speed, a large DR error is generated. By making the CYCLE_TIME a function of speed, the magnitude of the DR error can be reduced. It is first tested to determine if a user optional input, i.e., ADAPTIVE, is set to be TRUE (step 156-1). If ADAPTIVE is TRUE and the the speed of the GPS receiver is greater than a threshold speed S2, as determined by step 156-1, then the power to RF is kept on continuously and the execution of TURN_OFF_RF logic 150 is terminated and returned to the calling module (step 156-3). The RF power is kept on until the speed is reduced below S2 or when the user turns off the adaptive process by setting ADAPTIVE to FALSE. If the speed of the receiver is less than S2 as determined by step 156-1, then the speed is compared to a first threshold speed, i.e. S1 in step 156-4. If the speed is greater or equal to S1, then a new cycle time which is half of the regular cycle time is used (step 156-5), otherwise a regular CYCLE_TIME is kept unchanged and the program proceeded with step 156.

Figure 7:
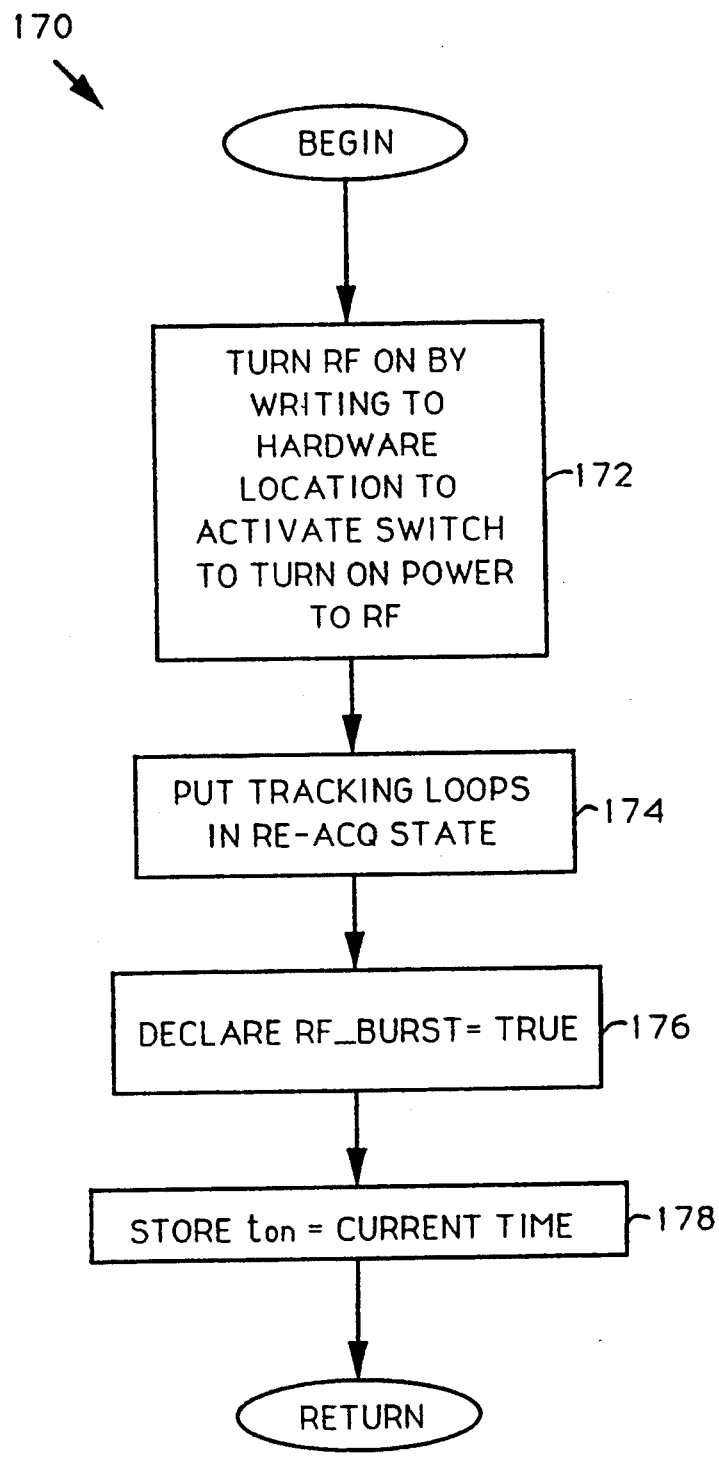
FIG. 7 is a flow chart diagram of the TURN_ON_RF module of the receiver of FIG. 1.

FIG. 7 shows the logic operations of TURN_ON_RF module 170 of the ROM 26. A hardware command is first issued to activate the switch to turn on the RF power in a step 172. The RF tracking loop is set to a reacquisition state, i.e. RE_ACQ=1, in a step 174. The RF burst is set to 1 (TRUE) to begin the RF burst cycle in a step 176 and the starting RF on time, i.e. t-on, is set to the current time in a step 178. The executable program residing in ROM 26 further computes a velocity vector of the GPS receiver 10 to determine the number of satellites and therefore position signals needed to compute a position fix, e.g., the number needed to satisfy a position accuracy requirement. A determination is made of the number of satellites that are providing position signals. The executable program turns-off power to the RF circuitry for a predetermined duration of time when the actual number of satellites equals or exceeds the required number of satellites, in order to conserve battery power.

The executable program residing in ROM 26 preferably includes a routine for determining if the actual number of satellites visible is less than the number of satellites required for position signals, e.g., a two dimensional position fix may be sufficient and available.

The executable program residing in ROM 26 stores a plurality of historical position fix data and a list of the visible satellites. If the actual number of satellites that position signals are being received from is less than a required number, the history of position fix data and the list of the visible satellites is used to determine if an additional RF burst should be performed to add the available measurement data.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A global positioning system (GPS) receiver having a radio frequency (RF) circuitry to receive position signals from a plurality of satellites and to provide an intermediate frequency (IF) signal to a correlator circuitry for generating a pseudo range and a Doppler measurement for calculating a position fix, the GPS receiver further comprising:
a power supply system having at least one battery and an alternative external power connector for connecting to an external power source; and
a microprocessor having a read only memory, the microprocessor being electrically connected to said RF circuitry and the power supply system; and
an executable program stored in said memory for automatically controlling the power supply system to provide on/off power control to said RF circuitry, and having means for computing a velocity vector of the GPS receiver for determining a required number of satellites wherefrom said position signals must be received for computing said position fix to satisfy a position accuracy requirement, said executable program further includes means for determining from monitoring said position signals received from said plurality of satellites an actual number of satellites wherefrom said position signals are being received, said executable program controls the power supply system to cut off battery power to said RF circuitry for a predetermined duration of time when said actual number of satellites is greater or equal to said required number of satellites wherefrom said position signals must be received, wherein a saving of battery power is provided whenever the power supply system is not provided with said external source of power at said alternative external power connector.

2. The GPS receiver of claim 1, wherein:
said executable program in said memory further includes means for determining a time gap duration between successive RF circuitry power-on periods as a function of said velocity vector of the GPS receiver wherein a dead reckoning (DR) error is reduced.

3. The GPS receiver of claim 2 wherein:
said executable program in said memory further includes means for a GPS user to input at least one threshold speed; and
said executable program further includes means to determine if speed of the GPS receiver is greater than said threshold speed, and adjusting said time gap duration between said RF circuitry power-on periods as a function of said velocity vector of the GPS receiver when the speed of the GPS receiver is greater than said threshold speed.

4. The GPS receiver of claim 1, wherein:
said executable program in said memory further includes means for storing a plurality of historical position fix data and a list of visible satellites, and if said actual number of satellites wherefrom said position signals are being received is less than said required satellites wherefrom said position signals must be received, said executable program further includes means by using said historical position fix data and said list of visible satellites to determine if an additional RF circuitry power-on is to be performed.

5. The GPS receiver in accordance with claim 1, wherein:
said executable program in said memory further includes means for determining if one of said satellites is lost and if said lost satellite has a low elevation and to discontinue a satellite acquisition for said lost satellite with said low elevation.

6. A GPS receiver in accordance with claim 1 wherein:
said executable program in said memory further includes means for determining if said actual number of satellites is less than said required number of satellites wherefrom said position signals must be received; said executable program further includes means for determining if a two dimensional position fix is sufficient and available, and to turn off the RF power when said actual number of satellites is less than said required number of satellites during a period of time, wherein the battery power is conserved.

7. A battery-operated global positioning system (GPS) receiver with extended battery life operation, comprising:
a battery connected to power said GPS receiver;
a receiver section for receiving position signals from a plurality of orbiting GPS satellites;
power switch means connected between the receiver section and the battery for turning power on and off to the receiver section in response to a control signal; and
navigation computer means connected to the receiver section for tracking said plurality of orbiting satellites and to the power switch means for turning on power to the receiver section with said control signal when the navigation computer means requires updates of said position signals to provide a position fix for said GPS receiver, wherein the battery life of the battery is extended by periodically powering-off the receiver section, and includes means for computing a velocity vector of said GPS receiver that influences the minimum number of GPS satellites providing said position signals that must be received for computing said position fix to a predetermined position accuracy, and further includes means for extending and shortening the time that said control signal causes the receiver section to be powered-on or powered-off in response to the time necessary to receive said position signals from said minimum number GPS satellites.

8. The GPS receiver of claim 1, further comprising:

man-machine interface means for user input of a number representing a threshold velocity;

comparator means coupled to the man-machine interface means and navigation computer means for determining if said computed velocity vector exceeds said threshold velocity; and power-on frequency adjusting means connected to the comparator means and the power switch means for increasing the on-time of the receiver section whenever said computed velocity vector exceeds said threshold velocity, otherwise the on-time of the receiver section is not affected.

9. A battery-operated global positioning system (GPS) receiver with extended battery life operation, comprising:

a battery connected to power said GPS receiver;

a receiver section for receiving position signals from a plurality of orbiting GPS satellites;

power switch means connected between the receiver section and the battery for turning power on and off to the receiver section in response to a control signal;

navigation computer means connected to the receiver section for tracking said plurality of orbiting satellites and to the power switch means for turning on power for a period of time to the receiver section with said control signal when the navigation computer means requires updates of said position signals to provide a position fix for said GPS receiver, wherein the battery life of the battery is extended by periodically powering-off the receiver section;

constellation means connected to the navigation computer means for determining if the number of GPS satellites accessed by the receiver section exceeds a required predetermined number of GPS satellites; and shut-down means connected to the power switch means and constellation means for turning-off power to the receiver section whenever there are lost satellites, but a sufficient number of GPS satellites have been accessed after a period of time to make available a good position fix.

* * * * *